Aug. 17, 1937.  R. A. WEBSTER ET AL  2,089,988
METHOD AND APPARATUS FOR INDICATING PEAK CONDITIONS OF PRESSURE PHENOMENA
Filed Aug. 15, 1935   4 Sheets-Sheet 1
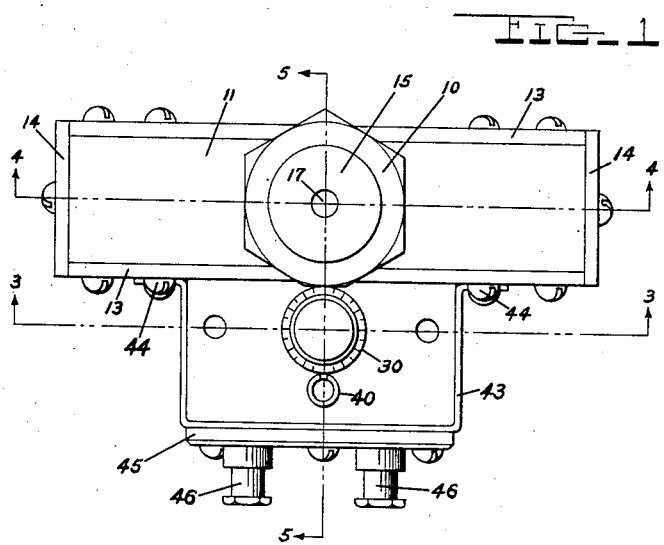
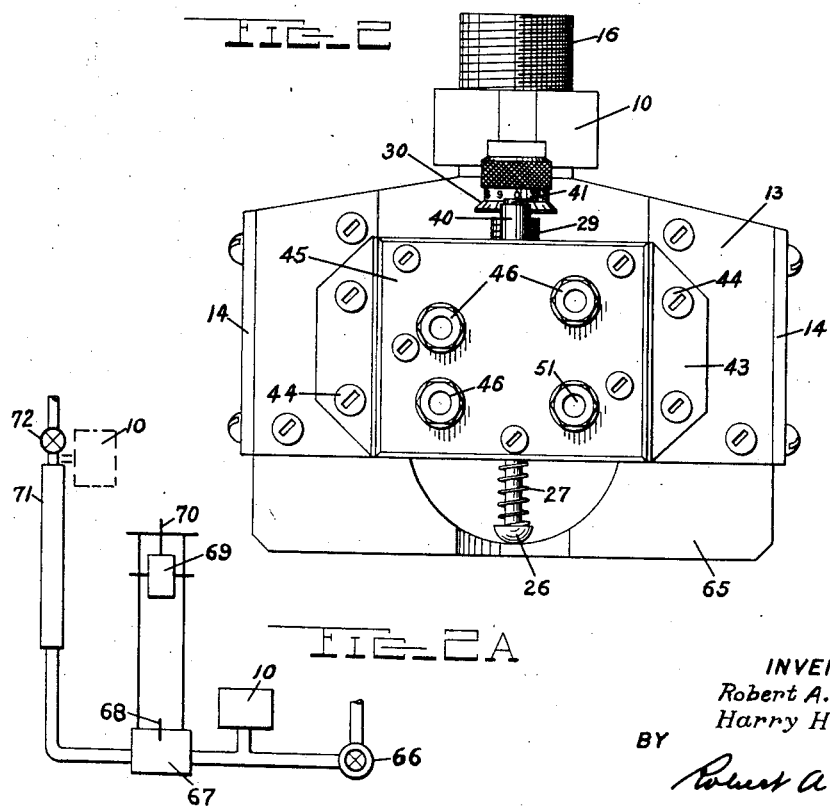
INVENTORS
Robert A. Webster
Harry Hill Moore
BY
Robert A. Lavender
ATTORNEY

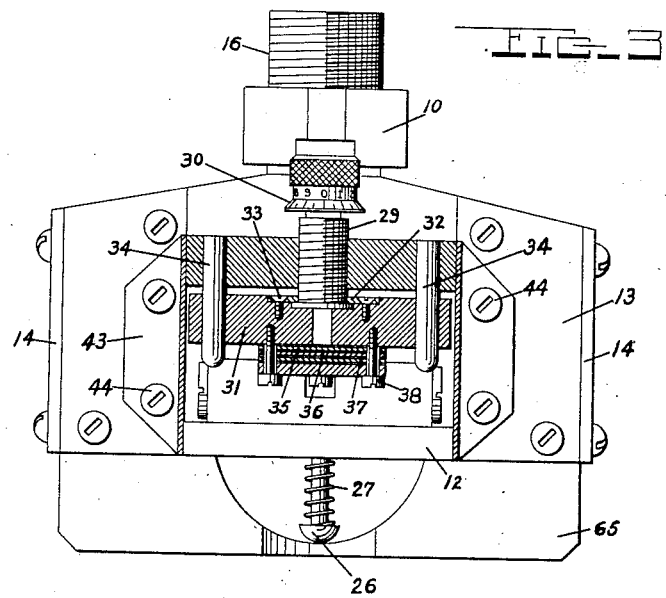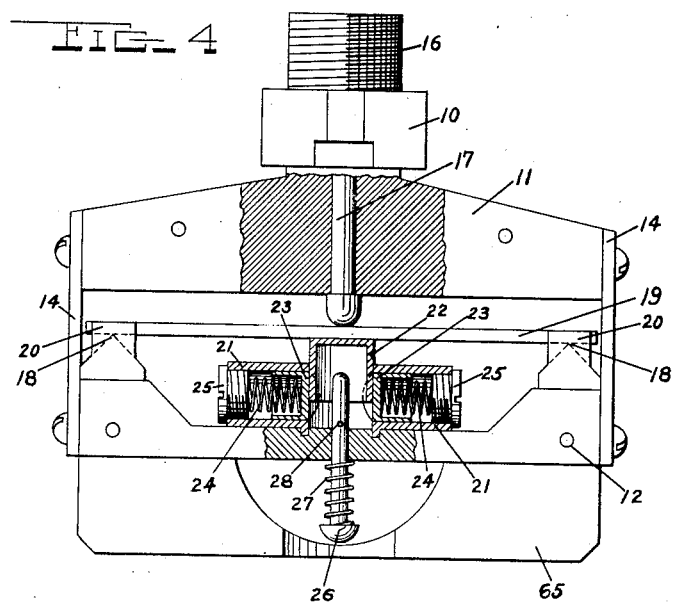

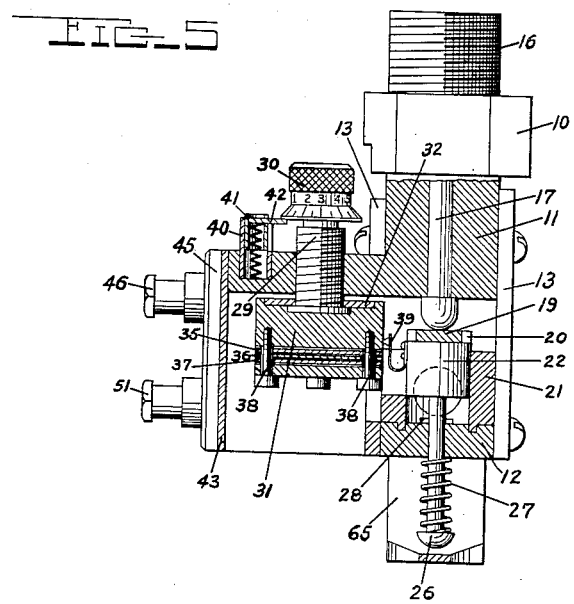
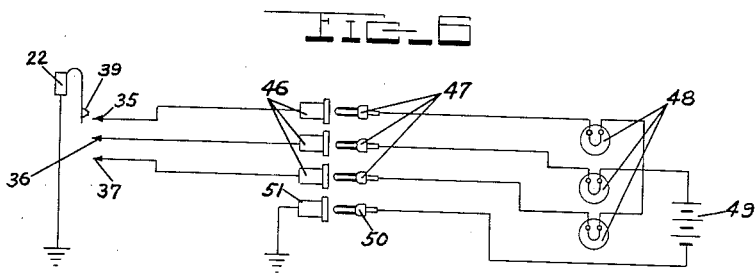
INVENTORS
Robert A. Webster
Harry Hill Moore
BY
ATTORNEY

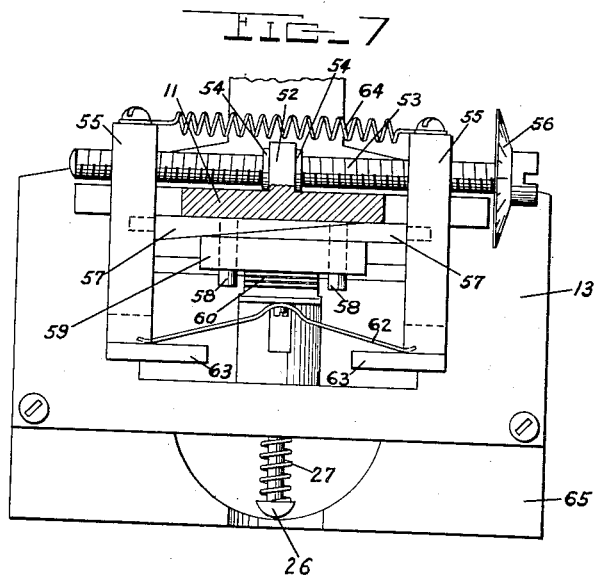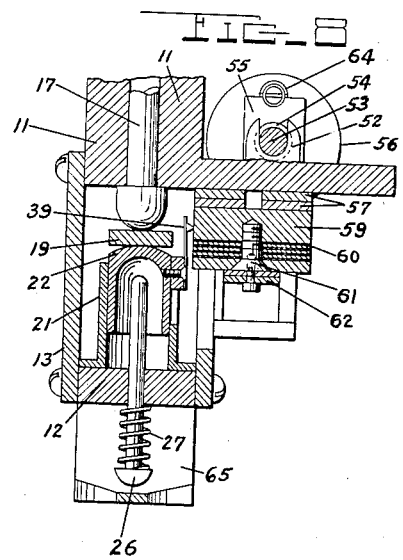

Patented Aug. 17, 1937

2,089,988

UNITED STATES PATENT OFFICE 2,089,988

METHOD AND APPARATUS FOR INDICATING PEAK CONDITIONS OF PRESSURE PHENOMENA

Robert A. Webster and Harry H. Moore, Washington, D. C.

Application August 15, 1935, Serial No. 36,332

10 Claims. (Cl. 177—311)

(Granted under the act of March 3, 1883, as amended April 30, 1928; 370 O. G. 757)

Heretofore the gauge indication of quite transitory pressures has remained unsolved because the indication was not definitely observable by the human eye. Our invention solves this long and vainly sought problem.

This invention relates broadly to methods and apparatus for determining pressure indications; and more particularly to determinations of peak pressure indications of transient pressure phenomena.

An important object of the invention is the registering of peak pressure changes of short duration and high rupturing intensity.

Another object of the invention is the registering of rapidly changing pressures and mechanical cycles of very short duration, such as rapidly changing fluid pressures.

Still another object of the invention is to provide a relatively light weight pressure gauge capable of sustaining high rupturing test pressures.

A still further object of the invention is to provide a pressure gauge which is quickly and readily adjustable over various test pressure ranges.

Having these general objects in view, and others that will appear as the nature of the improvements is better understood, the invention consists substantially in the novel construction, combination and method of operation of parts hereinafter fully described, illustrated in the accompanying drawings, and pointed out in the appended claims.

Reference is to be had to the accompanying drawings forming part of this specification in which like reference characters indicate corresponding parts throughout the several views, and in which, Figure 1 is a plan view of the indicating attachment, Figure 2 is a front elevation of the same assemblage, Figure 2A is a schematic representation of indicating attachment in combination with means for testing hollow articles.

Figure 3 is a front elevation in section on line 3—3 of Figure 1,

Figure 4 is a front elevation in section on line 4—4 of Figure 1,

Figure 5 is a side elevation in section on line 5—5 of Figure 1,

Figure 6 is a schematic wiring diagram of the lighting circuit system,

Figure 7 is a front elevation in section of the arrangement employing the inclined plane for elevating slidable member and, Figure 8 is side elevation in section of assemblage shown in Figure 7.

In the drawings, wherein for the purpose of illustration, is a preferred embodiment of the invention, the numeral 10 designates the assembled gauge case or housing, and is essentially composed of the upper casing member 11 and the lower casing member 12. The upper and lower casing members are integrally held together by the front and rear cover plates 13 and side cover plate 14, of appropriate weight to adequately support the casing members. The upper casing member 11 is appropriately recessed to form a hollow pressure inlet space 15, and the outer wall enclosing this pressure inlet space 15 forms the threaded connection 16.

Slidably supported within the upper casing member 11 is the plunger 17, representatively presented as a piston. The plunger 17 upwardly extends into the pressure inlet space 15, and the upper end of said plunger 17 is of appropriate cross-sectional area to transmit the downwardly acting pressure within the pressure inlet space 15 when the gauge is in operation. The plunger 17 is provided with suitable packing to prevent leakage and pressure drop.

The lower casing member 12 acts as a spring saddle carrying at its ends knife edges 18. These knife edges 18 support upwardly the resisting spring 19, so as to least impede or retard the momentarily impressed pressures transmitted from the pressure inlet space 15 by means of the plunger 17. These momentarily impressed pressures are of such short duration that means must be provided to appropriately and accurately transmit them. Advantage is taken of the fact that these momentarily impressed pressures are cyclic in nature. The resisting spring 19 is constructed so that it acts in a manner similar to that of a sounding board and is readily responsive to these cyclic pressures of short duration which are imposed upon it through the plunger 17. The construction of the resisting spring 19 is such as to accurately transmit these momentarily impressed pressures throughout a predetermined and accurately calibrated pressure range. The resisting spring 19 is appropriately retained on the knife edges 18, by guide lugs 20, upwardly extending from the ends of the supporting knife edge bases.

Upon the lower casing member 12 is appropriately secured a guide 21 bored to receive a piston-like member 22 so constructed as to be reciprocally movable in the bore of the guide 21. The piston-like member 22 is frictionally contacted by the plungers 23 forced in by springs 24 fitted in recesses at each end of the guide 21. The tension of the springs 24 is adjustably set by the adjusting screws 25 so as to appropriately dampen the piston-like member 22 when placed in motion by the downward thrust of the resisting spring 19 when responding to the pressure imparted downward motion of the plunger 17. The numeral 26 designates a plunger pin upwardly extending through an opening in the base of the lower casing member 12, suitably placed to engage the piston-like member 22, when upwardly operated. The spring 27 insures the return of the pin 26 to the unengaged position limited by the stop pin 28.

Mounted upon and through the upper casing member 11 is an adjustable screw mechanism consisting of a screw 29 operable by means of a dial piece 30. The lower end of the screw 29 is flanged so as to suitably carry a slidable member 31, when a closely fitting spring washer 32 is placed over the flange and secured to the slidable member 31 by means of screws 33. The slidable member 31 rides on the dowel pins 34 running through the slidable member 31 and secured in the upper casing member 11 of the gauge 10.

On the under side of the slidable member 31 are secured the contact pieces 35, 36, and 37, superimposed one upon the other and suitably insulated one from the other and from the slidable member 31. These contact pieces are secured to the slidable member 31 by means of the screws 38. The contact pieces 35, 36, and 37 are so placed and constructed that they appropriately may be contacted by a contactor 39 carried on the movable piston-like member 22.

Supported on the upper casing member 11 is a guide 40 within which moves a spring actuated plunger 41 provided with a lip 42 which appropriately engages the under side of the dial piece 30 so as to eliminate lost motion in the action of the screw 29.

The slidable member 31 is suitably housed in a casing 43 which is secured to the front casing 13 by means of the screws 44. Secured to the forward side of the casing 43 is a supporting piece 45 carrying the jacks 46. An apron 65 is provided on the under side of the lower casing member 12 to protect the pin 26 from damage.

Portably attachable to the gauge case 10 by means of the plugs 47 and jacks 46 is a system of incandescent lamps 48. The incandescent lamps are separately connected through the plugs and jacks to the contact pieces 35, 36, and 37 within the gauge case 10. Each lamp is individually and separately connected to a single individually insulated contact piece. The incandescent lamps are supplied with a source of electric current from a battery 49, grounded through the gauge case 10 by means of a plug 50 and jack 51 on the gauge case.

The operation of the pressure gauge is as follows:

The momentarily acting cyclic force within the inlet space 15 drives the plunger 17 downward. The plunger 17 transmits these cyclic pressures to the resisting spring 19 which is so constructed as to be accurately responsive to the cyclic pressures thus imposed upon it. The resulting motion of the resisting spring 19 imparts a corresponding motion to the piston-like member 22. When the force acting through the above enumerated parts ceases, having reached its peak value, the piston-like member 22 is brought to rest by the spring actuated plungers 23. The downward motion of the piston-like member 22 carries with it the contactor 39 which passes over the face of the slidable member 31, finally coming to rest on one of the contacts 35, 36, or 37. This related position of the contactor and contact is achieved by previously setting the slidable member 31 in approximately the position of peak displacement of the contactor 39, by operating the screw 29 according to previously calibrated marks on the dial piece 30. The dial piece 30 is calibrated in relation to the displacement of the resisting spring 19 when subjected to known pressure varying throughout a predetermined pressure range. When the contactor 39 thus comes to rest on one of the contacts 35, 36, or 37, a circuit is closed through one of the incandescent lamps and the said lamp remains illuminated, until the plunger pin 26 is manually moved upwardly, carrying with it the piston-like member 22 until it is brought to rest in its initial position against the under side of the resisting spring 19.

In Figures 7 and 8 is embodied a construction utilizing the inclined plane for elevating the slidable member 59. Mounted on the upper casing member 11 is a partially open bearing 52 supportably carrying the screw 53. The collars 54 are closely fitted with the end surfaces of the bearing 52 to appropriately support the screw 53 and retain the screw in a relatively fixed position in relation to the upper casing member 11 when the screw 53 is rotated in the bearing 52 by means of the dial piece 56. Adjusting blocks 55 are mounted on the screw 53, one on each side of the bearing 52, and are capable of being moved toward or away from each other by the simple rotation of the screw 53. This opposed motion of the adjusting blocks is accomplished by means of opposed screw threads on the screw 53. Attached to the adjusting blocks 55 are two wedges 57 whose inclined planes are opposed to each other. The upper surfaces of the wedges bear upon and against the under side of the upper casing member 11. Slidably mounted upon the dowel pins 58, which protrude through slots cut in the wedges 57, and are secured in the upper casing member 11, is a slidable member 59. The insulated contacts 60 are secured to the under side of the slidable member 59 by means of the screw 61. The slidable member 59 is firmly pressed against the wedges 57 by the spring 62, which is supportably carried by lip extensions 63 of the adjusting blocks 55. A spiral spring 64 is secured by screws to the upper ends of the adjusting blocks 55 to always hold the adjusting blocks firmly pressed against the wedges 57.

The remainder of the construction of the pressure gauge is the same as that previously described in connection with the first embodiment of the invention.

The operation of the inclined plane construction is as follows:

The rotation of the dial piece 56 actuates the screw 53 which causes the adjusting blocks 55 to move toward or away from each other. This movement of the adjusting blocks 55 actuates the wedges 57, which control the raising or lowering of the slidable member 59 and thus effect the preliminary adjustment of the insulated contacts 60.

The detailed operation of the entire gauge previously has been described in connection with the first embodiment of the invention.

Figure 2A is a schematic representation of a system for testing hollow articles for flaws and weakened portions. The pressure gauge 10 is shown in combination with such a system. The numeral 66 indicates a valve for filling the hydraulic system from a source of water supply. Within the system is the pressure gauge 10 which is connected with a pressure chamber 67. Within the chamber is a piston 68 which is so constructed as to receive the force of a weight 69 when released by retaining catch 70. The numeral 71 indicates the hollow article which is subjected to a testing pressure imparted from the pressure chamber 67. The numeral 72 indicates a vent valve for freeing the entire system of air.

The operation of the system is as follows:

The vent valve 72 is opened and the entire system is filled with water through the filling valve 66. When the system is completely filled valves 72 and 66 are closed. The weight 69 is allowed to fall and to strike the piston 68, which produces a testing pressure within the pressure chamber 67. This pressure is transmitted equally throughout the system and subjects the hollow article 71 to a pressure test.

This pressure which is imposed upon the hollow article is only momentarily applied. The pressure is transient in nature. The testing pressure is not a building up pressure, but is a pressure cyclic in nature and of but short duration. Because of the shortness of duration of this momentarily applied testing pressure advantage has been taken of the cyclic nature of the testing pressure in the utilization within the pressure gauge 10 of a resisting spring 19 which is so constructed as to be accurately responsive to the momentarily imposed cyclic test pressure. Of course the momentarily imposed test pressure may be calculated approximately. Without the gauge in combination the test pressure may be calculated by taking into consideration the weight used and the height of drop of the weight. The calculated pressure will be that within the pressure chamber. This pressure will be partially dissipated in losses before reaching the hollow article under test. What these losses may be is problematical. The purpose served by the gauge in combination is to accurately determine the actual pressure transmitted to the hollow article under test. To insure accurate readings the gauge may be placed at one end of the hollow article under test as indicated by the dotted representation of the gauge 10 in Figure 2A. An experienced operator will not be needed to conduct the tests where the gauge is used in combination. Such will not be the case where the pressure must be calculated. The registering of the actual pressure imposed upon the hollow article 71 is effected by means of the pressure gauge 10, which is the matter of invention disclosed in this application.

The testing apparatus herein schematically represented is the same as in the Patent Number 1,909,703, issued May 16, 1933, to the joint inventors, Harry H. Moore, Robert A. Webster, and Harold H. Little.

The above description is a general embodiment of the construction and method of operation of the apparatus, and contemplates the use of the inclined plane, the differential screw, or other similar means of elevating the slidable member. Figures 7 and 8 show the embodiment of the inclined plane while Figures 1, 2, 3, 4, and 5 show that of a straight screw adjustment.

It will be understood that the above description and accompanying drawings comprehend only the general and preferred embodiment of the invention and that minor changes in details of construction, proportion and arrangement of parts may be made within the scope of the appended claims and without sacrificing any of the advantages of the invention.

The herein described invention may be manufactured and used by or for the Government of the United States for governmental purposes without the payment to us of any royalty thereon or therefor.

Having thus described the invention, we claim:

1. A pressure indicating attachment comprising a case having upper and lower casing members with an inlet in the upper casing member, a piston movable within the upper casing member and extending within the inlet, a resisting spring resonantly responsive to transient cyclical pressures transmitted by the piston, knife edges mounted on the lower casing member upwardly supporting the resisting spring near its outer ends, a guide mounted centrally on the lower casing member, a piston contactor supported within a bored opening in the guide and downwardly movable with the movement of the resisting spring, opposed spring plungers retained within recesses of the guide, said plungers frictionally resting against the piston contactor, a headed screw provided with a flange at its lower end and mounted within a threaded opening in the upper casing member, a slidable member freely attached to flange of screw, severally insulated contacts secured to the under side of the slidable member to successively contact the piston contactor, an upwardly acting spring plunger engaging the under side of the head of the screw, a spring controlled pin mounted in an opening in the lower casing member and capable of engaging the under side of the piston contactor, a system of low voltage lamp circuits provided with individual terminal plugs, said plugs attachable to externally placed jacks on the gauge case, said jacks establishing within the gauge case connections for the separate circuits through the severally insulated contacts and the piston contactor.

2. A pressure indicating attachment comprising a supporting casing having an inlet, a plunger communicating with the interior of the inlet, a resisting spring cyclically resonant to transient pressures transmitted by the plunger, knife edges upwardly supporting the resisting spring at its outer ends, guide means on the lower casing, a piston contactor within the guide means and downwardly movable with the movement of the resisting spring, frictional means for damping downward movement of the piston contactor, a calibrated screw threaded through the upper casing, a slidable member freely attached to lower end of the screw, guide pins extending through the slidable carrier member, severally insulated contacts secured to the carrier member, said contacts contacting the piston contactor, means for removing play in the threaded movement of the calibrated screw, means for detachably and upwardly engaging the piston contactor, a system of incandescent lighting composed of lamp circuits externally attachable through the casing to circuits completed through the insulated contacts and piston contactor within the casing.

3. A pressure indicating attachment comprising a casing having an inlet, plunger means extending within the inlet, a resisting spring cyclically responsive to transient pressures transmitted through the plunger means, knife edges mounted on the casing for supporting the resisting spring, a piston-cylinder means, said piston means being a contactor means and movable in one direction under the actuating movement of the resisting spring, means for damping accelerated movement of the contactor means, a screw mechanism threaded through the casing, a slidable carrier freely attached to the screw, guide means for the slidable carrier, insulated contacts attached to the slidable carrier, said contacts contacting the contactor means, means engaging the screw mechanism for preventing lost motion between the threaded parts, retractible means for engaging the contactor means, and a system of incandescent lighting circuits externally attachable through openings in the casing to interior circuits within the casing, said interior circuits being completed through the insulated contacts and the contactor means.

4. A pressure indicating attachment comprising a casing having an inlet, a pressure actuated piston means communicating with the interior of the inlet, a resisting spring transversely disposed to the piston means, said resisting spring being cyclically responsive to transient pressures of high intensity transmitted by the piston means, supporting means for the resisting spring, slidable contactor means movable in one direction cooperatively with the movement of the resisting spring, means for damping the movement of the contactor means, a slidable carrier mechanism operable through the casing, insulated contacts attached to the slidable carrier mechanism, said contacts contacting the slidable contactor means, a system of incandescent lamp circuits separately completed through the severally insulated contacts and the slidable contactor means.

5. A pressure indicating attachment comprising a casing having an inlet for a part of the medium under rapidly changing pressures, piston means for transmission of the transient cyclical pressure changes impressed upon the medium under pressure, a resisting spring knife edge mounted contactually operable by the piston means, contactor means cooperatively movable by the resisting spring movement, means for damping the movement of the contactor means, said damping means finally holding the contactor means in its most advanced position, contact means scalably adjustable in relation to the slidable contactor, and a plurality of electric lamp circuits closed by the contactual movement of the contactor means over the contact means.

6. A pressure indicating attachment comprising a casing having an inlet, means for transmitting the transient test pressures within the inlet, means cyclically resonant to the transmitted transient test pressures, plunger contactor means movable by the oscillating means, means for damping the movement of the contactor means, adjustable severally insulated contact means, and a system of incandescent lamp circuits separately completed through the severally insulated contact means and the plunger contactor means.

7. A pressure indicating attachment comprising a casing having an inlet, means for transmission of the transient test pressures within the inlet, oscillating means resonant to the transmitted test pressures, contactor means operable by the oscillating means, adjustable contact means, and a system of electric circuits completed through the contact means and the contactor means.

8. A pressure indicating attachment comprising a supporting casing having an inlet, a plunger communicating with the interior of the inlet, a resisting spring cyclically resonant to transient pressures transmitted through the plunger, knife edges upwardly supporting the resisting spring at its outer ends, guide means on the lower casing, a piston contactor within the guide means and downwardly movable with the movement of the resisting spring, frictional means for damping downward movement of the piston contactor, a calibrated screw freely rotatable in a retaining bearing, said screw having opposed threads at its opposite ends, adjusting blocks carried on the opposed threaded portions of the screw, superimposed wedges fixed to the adjusting blocks, a slidable carrier member abutting upon the wedges, guide pins extending through the slidable carrier member, severally insulated contacts secured to the carrier member, said contacts contacting the piston contactor, spring means for maintaining the carrier member in an abutting position in relation to the wedges, means for detachably and upwardly engaging the piston contactor, a system of incandescent lighting composed of lamp circuits externally attachable through the casing to circuits completed through the insulated contacts and piston contactor within the casing.

9. A pressure indicating attachment comprising a supporting casing having an inlet, piston means extending within the inlet, a resisting spring resonant to transient cyclical pressures transmitted by the piston means, knife edge supports for the resisting spring, contactor means operable by the downward movement of the resisting spring, means for damping the resisting spring actuated movement of the contactor means, a relatively fixed rotatable screw having its ends oppositely threaded, adjusting blocks mounted upon the opposed threaded ends, superimposed wedges cooperatively movable by the action of the adjusting blocks, a carrier member abutting upon the wedges, guide pins extending through the carrier member, insulated contacts secured to the carrier member, said contacts contacting the contactor means, means for retaining carrier member abutting upon the wedges, retractible means for engaging the contactor means, and a system of incandescent lighting circuits externally attachable through openings in the casing to interior circuits within the casing, said interior circuits being completed through the insulated contacts and the contactor means.

10. A pressure indicating attachment comprising a casing having an inlet, piston means in communication with the interior of the inlet, a cyclically resonant spring actuated by the piston means, support means for the resisting spring, contactor means movable by the resisting spring, means for damping the movement of the contactor means, an opposed screw mechanism, adjusting blocks carried on the opposed screw, superimposed wedges operable by the adjusting blocks, slidable contact means movable by the wedges, said slidable contact means contacting the contactor means, means for maintaining the contact means in an abutting position in relation to the wedges, and a system of incandescent lamp circuits separately completed through the severally insulated contacts and the contactor means.

ROBERT A. WEBSTER.
HARRY H. MOORE.